(12) United States Patent
Baba et al.

(10) Patent No.: US 8,045,765 B2
(45) Date of Patent: Oct. 25, 2011

(54) IMAGE PROCESSING METHOD, IMAGE PROCESSING SYSTEM, IMAGE PROCESSING DEVICE, AND COMPUTER PROGRAM PRODUCT

(75) Inventors: Kozo Baba, Oita (JP); Hisao Ito, Oita (JP); Akiyoshi Tafuku, Oita (JP); Masatoshi Tohno, Kawasaki (JP); Taku Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1103 days.

(21) Appl. No.: 11/889,999

(22) Filed: Aug. 17, 2007

(65) Prior Publication Data
US 2007/0292001 A1     Dec. 20, 2007

Related U.S. Application Data

(63) Continuation of application No. PCT/JP2005/002466, filed on Feb. 17, 2005.

(51) Int. Cl.
*G06K 9/00* (2006.01)
(52) U.S. Cl. .................................... 382/118; 382/296
(58) Field of Classification Search .................. 382/118
See application file for complete search history.

(56) References Cited

U.S. PATENT DOCUMENTS

| | | | | |
|---|---|---|---|---|
| 5,596,362 | A * | 1/1997 | Zhou | 348/14.01 |
| 5,852,669 | A * | 12/1998 | Eleftheriadis et al. | 382/118 |
| 6,173,069 | B1 * | 1/2001 | Daly et al. | 382/118 |
| 6,332,037 | B1 * | 12/2001 | Zhu | 382/173 |
| 6,879,323 | B1 * | 4/2005 | Takezawa et al. | 345/420 |
| 7,155,036 | B2 * | 12/2006 | Li | 382/118 |
| 7,181,050 | B1 * | 2/2007 | Daly et al. | 382/118 |
| 7,187,786 | B2 * | 3/2007 | Kee | 382/118 |
| 7,349,558 | B2 * | 3/2008 | Enomoto | 382/118 |
| 2002/0150280 | A1 * | 10/2002 | Li | 382/117 |
| 2004/0151350 | A1 | 8/2004 | Tafuku et al. | |
| 2004/0180690 | A1 | 9/2004 | Song et al. | |

(Continued)

FOREIGN PATENT DOCUMENTS

JP      2000-163564      6/2000

(Continued)

OTHER PUBLICATIONS

Shigeki Aoki et al., "Estimating Eye Direction by Extracting Region of Driver's Eye", Technical Report of The Institute of Electronics, Information and Communication Engineers Gijutsu Kenkyu Hokoku, Nov. 1999, vol. 99, No. 450, pp. 15-22.

(Continued)

*Primary Examiner* — Sath V Perungavoor
(74) *Attorney, Agent, or Firm* — Staas & Halsey LLP

(57) ABSTRACT

For example, a plurality of elliptical candidate areas that become candidate areas of detecting objects are set in an image, characteristic values such as average values of luminance of the pixels inside and outside the set candidate areas are compared, and a candidate area whose difference of the characteristic values is determined to be the maximum is detected as the area of the detecting object. In addition, central moment of the detecting object is calculated, and the inclination of the detecting object in the image is detected based on the calculated central moment. Further, two specific points such as eyes of the driver included in the detecting object are detected, and the inclination of the detecting object in the image determined by the detected two points is detected.

17 Claims, 10 Drawing Sheets

U.S. PATENT DOCUMENTS

| | | | |
|---|---|---|---|
| 2005/0041868 A1* | 2/2005 | Chupeau et al. | 382/195 |
| 2007/0292001 A1* | 12/2007 | Baba et al. | 382/118 |

FOREIGN PATENT DOCUMENTS

| | | | |
|---|---|---|---|
| JP | 2000-354247 | | 12/2000 |
| JP | 2001-076145 | * | 3/2001 |
| JP | 2001-76145 | | 3/2001 |
| JP | 2003-196655 | | 7/2003 |
| JP | 2003-281539 | | 10/2003 |
| JP | 2004-206707 | | 7/2004 |
| JP | 2004-234367 | | 8/2004 |
| JP | 2004-234494 | | 8/2004 |
| JP | 2005-038178 | | 2/2005 |

OTHER PUBLICATIONS

Hitoshi Ono et al., "Neural Network Recognition of Facial Expression Using Invariant Moment" Transactions of the Institute of Electrical Engineers of Japan, Nov. 1995, vol. 115-C, No. 12, pp. 1568-1569.

Hiroshi Shimoda et al., "A Prototype of a Real-time Expression Recognition System from Dynamic Facial Image", Journal of Human Interface Society, May 1999, vol. 1., No. 2, pp. 25-32.

International Search Report of International Published Application No. PCT/JP2005/002466 (mailed Apr. 15, 2005).

Japanese Office Action mailed on Jun. 29, 2010 in corresponding Japanese Patent Application 2007-503529.

* cited by examiner

F I G. 7
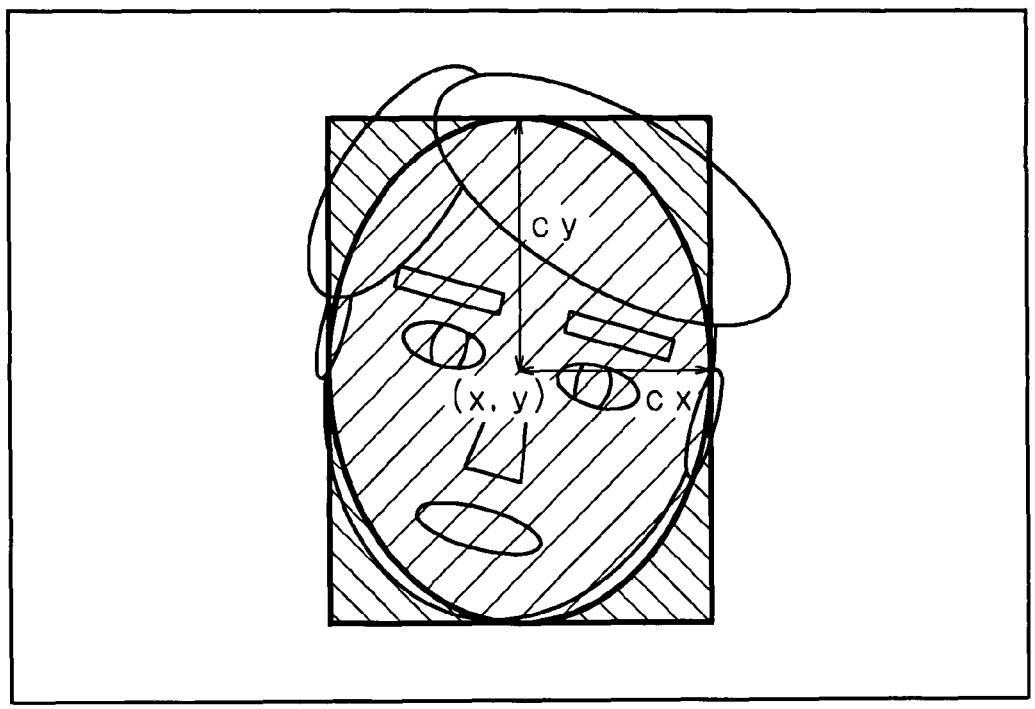

IMAGE PROCESSING METHOD, IMAGE PROCESSING SYSTEM, IMAGE PROCESSING DEVICE, AND COMPUTER PROGRAM PRODUCT

CROSS-REFERENCE TO RELATED APPLICATIONS

This application is a continuation of PCT International Application No. PCT/JP05/002466 which has an International filing date of Feb. 17, 2005 and designated the United States of America.

BACKGROUND

1. Field of the Invention

The present invention relates to an image processing method using an image processing device which detects a specific detecting object from an image including a plurality of two-dimensionally arranged pixels, an image processing system to which the image processing method is applied, an image processing device used in the image processing system, and a computer program product for realizing the image processing device, and more particularly relates to the image processing method, the image processing system, the image processing device and the computer program product for improving accuracy of detection of detecting objects.

2. Description of the Related Art

As a device for supporting driving of a vehicle such as an automobile, there is proposed an image processing device for imaging a face of a driver by using an on-vehicle camera mounted on a vehicle disposed at a position capable of imaging the face of the driver and performing image processing for detecting an outline of the face, positions of eyes and nostrils of the driver from the image acquired (for example, see Japanese Patent Application Laid-Open No. 2004-234367). By using such a device, it is possible to constitute a system capable of detecting a condition of the driver and performing driving support such as a warning, in accordance with the condition of the driver, such as an inattentive driving and a drowsy driving.

However, with a movement of the vehicle, illuminance and angle on beams such as solar beams are always changed, and an irradiation condition of the beams to the face of the driver is not uniform. Therefore, it is requested that the face of the driver is detected by various methods and a condition of the driver is detected comprehensively. In addition, in a conventional system, when the driver inclines his/her face, a problem is that there is a high possibility that error is generated in detection.

SUMMARY

The present invention is achieved in view of the above-described circumstances, a main object is to provide an image processing method capable of improving detection accuracy, because a position of the detecting object can be viewed as a two-dimensional area by detection of an area to which a candidate area that are to be a candidate of the area of the detecting object is fitted from an image obtained by processing such as imaging, and an image processing system to which the image processing method is applied, an image processing device used in the image processing system, and a computer program product for realizing the image processing device.

In addition, another object of the present invention is to provide the image processing method capable of improving accuracy of detection by detecting an inclination of the detecting object, the image processing system to which the image processing method is applied, the image processing device used in the image processing system, and the computer program product for realizing the image processing device.

An image processing method according to the first aspect is an image processing method using an image processing device which detects a specific detecting object from an image including a plurality of two-dimensionally arranged pixels, characterized by comprising the steps of: setting a plurality of candidate areas that become areas of a detecting object in the image; comparing characteristic values of the pixels inside the candidate areas with characteristic values of the pixels outside the candidate areas, for each of the set candidate areas; and detecting an area suitable to the detecting object out of a plurality of the set candidate areas on the basis of the comparison result.

An image processing system according to the first aspect is an image processing system including an imaging device which generates an image and an image processing device which detects a specific detecting object from the image including a plurality of two-dimensionally arranged pixels, characterized in that the image processing device comprises: a setting part which sets a plurality of candidate areas that become areas of a detecting object in the image; a comparing part which compares characteristic values of the pixels inside the candidate areas with characteristic values of the pixels outside the candidate areas, for each of the set candidate areas; and a detecting part which detects an area suitable to the detecting object out of a plurality of the set candidate areas on the basis of the comparison result.

An image processing device according to the first aspect is an image processing device which detects a specific detecting object from an image including a plurality of two-dimensionally arranged pixels, characterized by comprising: a part which sets a plurality of candidate areas that become areas of the detecting object in the image; a part which compares characteristic values of the pixels inside the candidate areas with characteristic values of the pixels outside the candidate areas, for each of the set candidate areas; and a part which detects an area suitable to the detecting object out of a plurality of the set candidate areas, based on the comparison result.

According to the first aspect, by verifying a plurality of the set candidate areas based on the characteristic values of pixels, areas having high possibility of matching with the detecting object can be detected. Therefore, the detecting object can be viewed not as a one-dimensional width but as a two-dimensional area, thus making it possible to improve the accuracy of detection of a detecting object.

An image processing method according to the second aspect is, in the image processing method according to the first aspect, characterized in that the step of comparing is performed by comparing average luminance of the pixels inside the candidate areas with average luminance of the pixels outside the candidate areas as the characteristic values of the pixels.

An image processing system according to the second aspect is, in the image processing device according to the first aspect, characterized in that the comparing part compares average luminance of the pixels inside the candidate areas with average luminance of the pixels outside the candidate areas as the characteristic values of the pixels.

According to the second aspect, by comparing average luminance inside and outside the candidate areas, the detecting object with high luminance and a background with low luminance can be discriminated, thus making it possible to improve the accuracy of detection of a detecting object.

An image processing method according to the third aspect is, in the image processing method according to the second aspect, characterized in that the step of detecting is performed by detecting a candidate area, whose difference of characteristic values is determined to be the maximum, as an area of the detecting object.

An image processing system according to the third aspect is, in the image processing system according to the second aspect, characterized in that the detecting part detects a candidate area, whose difference of characteristic values is determined to be the maximum, as an area of the detecting object.

According to the third aspect, for example, the area where significant points such as pixels with high luminance are concentrated in an overall image is discriminated as the area of the detecting object different from the background. Therefore, the accuracy of detection of a detecting object can be improved.

An image processing method according to the fourth aspect is, in the image processing method according to the third aspect, characterized in that the step of setting is performed by setting an elliptical area defined by using a center and lengths in both a first direction and a second direction orthogonal to each other, as the candidate area.

An image processing system according to the fourth aspect is, in the image processing system according to the third aspect, characterized in that the setting part sets an elliptical area defined by using a center and lengths in both a first direction and a second direction orthogonal to each other, as the candidate area.

According to the fourth aspect, by defining an elliptical shape considered to be easy to be matched with the shape of the driver's face as a candidate area, the face of the driver can be accurately detected as the detecting object.

An image processing system according to the fifth aspect is, in the image processing system according to the fourth aspect, characterized in that the detecting object has a reference point and a reference direction, and the image processing device further comprises: a part which calculates central moment around the reference point, based on distribution of luminance of the pixels according to the detecting object detected by the detecting part; and a part which detects an inclination of the detecting object in the reference direction in the image, based on the calculated central moment.

According to the fifth aspect, by detecting the inclination of the detecting object based on central moment, it is possible to perform the multiple detection such as viewing the condition where the driver, being the detecting object inclines the face. This makes it possible to improve the accuracy of detection of a detecting object.

An image processing system according to the sixth aspect is, in the image processing system according to the fourth aspect, characterized in that the image processing device further comprises: a part which sets, as a circumscribed rectangle, a rectangle that circumscribes an area suitable to the detecting object detected by the detecting part and has one side parallel to the first direction; a part which sets a reference luminance on the basis of distribution of luminance of pixels which are included in the set circumscribed rectangle; a part which calculates central moment around the center on the basis of the distribution of the pixels with higher luminance than the reference luminance in the circumscribed rectangle; and a part which detects an inclination of the detecting object in the first direction in the image.

According to the sixth aspect, by detecting the inclination of the detecting object based on central moment, it is possible to perform the multiple detection such as viewing the condition where the driver, being the detecting object inclines the face. This makes it possible to improve the accuracy of detection of a detecting object.

An image processing method according to the seventh aspect is an image processing method using an image processing device which detects a specific detecting object from an image including a plurality of two-dimensionally arranged pixels, characterized by comprising the steps of detecting two specific points included in the detecting object; and detecting an inclination of the detecting object in the image defined by the detected two points.

An image processing system according to the seventh aspect is an image processing system including an imaging device which generates an image and an image processing device which detects a specific detecting object from the image including a plurality of two-dimensionally arranged pixels, characterized in that the image processing device comprises: a detecting part which detects two specific points included in the detecting object; and a part which detects an inclination of the detecting object in the image, said inclination being defined on the basis of the detected two points.

An image processing device according to the seventh aspect is an image processing device which detects a specific detecting object from an image including a plurality of two-dimensionally arranged pixels, characterized by comprising: a part which detects two specific points included in the detecting object; and a part which detects an inclination of the detecting object in the image, said inclination being defined on the basis of the detected two points.

According to the seventh aspect, two specific points included in the detecting object such as eyes of a driver are detected, and based on a positional relation of the detected two points, the inclination of the detecting object can be detected. Thus, it is possible to perform multiple detection of viewing the condition where the driver inclines the face, so as to make it possible to improve the accuracy of detection of a detecting object.

An image processing method according to the eighth aspect is, in the image processing method according to the seventh aspect, characterized in that an imaging device is connected to the image processing device; the detecting object is a face of a person imaged by the imaging device; and the step of detecting is performed by detecting both eyes of the person, as two specific points.

An image processing system according to the eighth aspect is, in the image processing system according to the seventh aspect, characterized in that the detecting object is a face of a person imaged by the imaging device, and the detecting part detects both eyes of the person as two specific points.

According to the eighth aspect, by detecting the inclination of the face of a person such as a driver, the person can be multilaterally detected with high accuracy. Therefore, even when the driving is performed under circumstances where the illuminance and angle of the beams such as solar beams are always changed, the reliable system with little error detection can be configured.

An image processing method according to the ninth aspect is, in the image processing method according to the eighth aspect, characterized by further comprising the step of generating an image for detection of the detecting object by reducing an original image.

An image processing system according to the ninth aspect is, in the image processing system according to the eighth aspect, characterized by further including a part which generates an image for detection of the detecting object by reducing an original image.

According to the ninth aspect, by applying detection processing to a reduced image, reduction of a processing load is possible.

Computer program products according to the present invention are characterized by realizing the image processing system or the image processing device according to the first or eighth aspect by a general purpose computer system.

The image processing method, the image processing system, the image processing device and the computer program product according to the above mentioned each aspect are applied to a system of detecting the face of the driver as the detecting object from the image obtained by imaging the face of the driver by the imaging device such as an on-vehicle camera mounted on the vehicle; sets a plurality of elliptical candidate areas, for example, that become the candidate areas of detecting objects in the image; compares the characteristic values such as average values of the luminance of the pixels inside and outside the set candidate areas, and detects the candidate area whose difference of the characteristic values is determined to be the maximum, as the area of the detecting object.

With this configuration, the area with high possibility of matching with the detecting object can be detected, thus exhibiting an excellent effect that the detecting object can be viewed not as the one-dimensional width but as the two-dimensional area, and the accuracy of detection of detecting objects can be improved. In addition, by defining the elliptical shape considered to be easy to be matched with the shape of the face of the driver as the candidate area, it is possible to exhibit the excellent effect that the face of the driver as the detecting object can be detected with high accuracy. Further, since the area where the pixels with high luminance are concentrated is determined to be the area of the detecting object different from the background, it is possible to exhibit the excellent effect that the accuracy of detection of detecting objects can be improved. Moreover, by improving the accuracy of the detection of the detecting object, it is possible to exhibit the excellent effect that the condition of the driver is sensed, and when applied to the system of performing the driving support such as warning of inattentive driving, a reliable driving support system with little error detection can be configured even when the driving is performed under an environment where the condition of external light is always changed.

In addition, according to the image processing system and the like of each aspect, the reference luminance is set based on the distribution of the luminance of the pixels included in a circumscribed rectangle circumscribing the elliptical detecting object; the central moment around the center is calculated based on the distribution of the pixels with higher luminance than the reference luminance in the circumscribed rectangle; and the inclination of the detecting object in the image is detected based on the calculated central moment.

With this configuration, it is possible to perform the multiple detection such as detecting the condition of the driver, being the detecting object, who inclines the face. Therefore, it is possible to exhibit the excellent effect that the accuracy of detection of a detecting object can be improved. Then, by improving the accuracy of detection of the detecting object, it is possible to exhibit the excellent effect that the reliable driving support system with little error can be configured.

In addition, the image processing method, the image processing system, the image processing device, and the computer program product according to each aspect are applied to the system of detecting the face of the driver as the detecting object, from the image obtained by imaging the face of the driver by the imaging device such as an on-vehicle camera mounted on a vehicle, and the two specific points such as the eyes of the driver included in the detecting object are detected and the inclination of the detecting object in the image defined from the detected two points is detected.

With this configuration, the area of the face of a person such as the driver can be detected with high accuracy. Therefore, even when the driving is performed under circumstances where the luminance and the angle of the beams such as solar beams are always changed, it is possible to exhibit the excellent effect that the reliable system with little error detection can be configured.

In addition, as a pre-processing, by detecting the detecting object after the imaged image is reduced, the processing amount of the detection processing with large processing load is reduced, making it possible to reduce the processing load. Accordingly, when applied to the system of performing the driving support, it is possible to exhibit the excellent effect that high-speed processing can be realized and the driving support system capable of responding to even an unexpended situation can be configured.

The above and further objects and features of the invention will more fully be apparent from the following detailed description with accompanying drawings.

BRIEF DESCRIPTION OF THE SEVERAL VIEWS OF THE DRAWINGS

FIG. 7 is an explanatory view conceptually showing the example of a candidate area and a circumscribed rectangle set in the image processing system according to the embodiment 1 of the present invention;

DETAILED DESCRIPTION

The present invention will be described in detail below, based on the drawings showing Embodiments.

Embodiment 1

Figure 1:
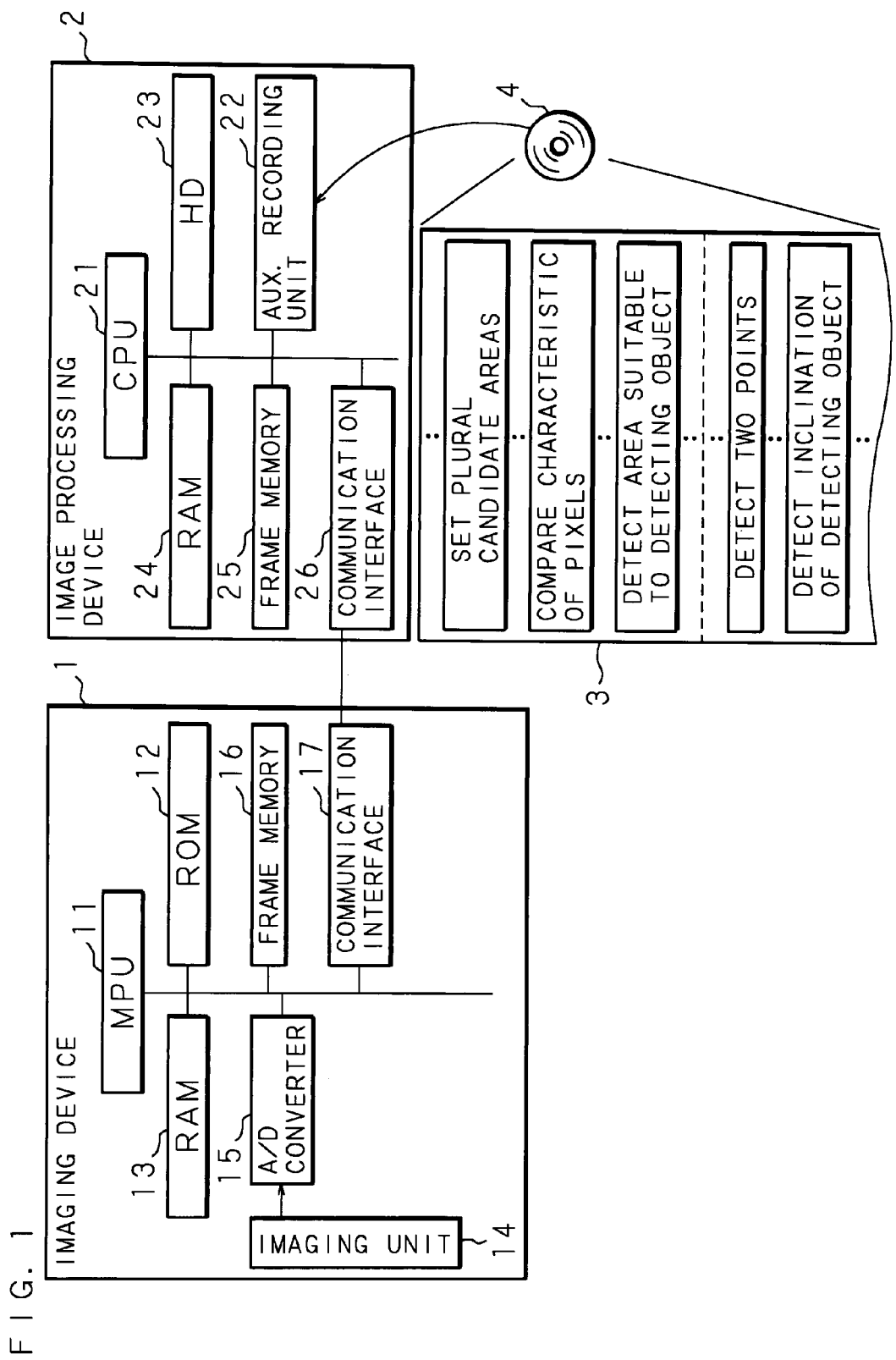
FIG. 1 is a block diagram showing a configuration example of an image processing system according an embodiment 1 of the present invention.

FIG. 1 is a block diagram showing a configuration example of an image processing system according to an embodiment 1 of the present invention. In FIG. 1, reference numeral 1 denotes an imaging device such as an on-vehicle camera mounted on a vehicle, and the imaging device 1 is connected to an image processing device 2 that performs image processing, through a communication line such as an exclusive cable, or a communication network such as an on-vehicle LAN (Local Area Network) constituted by wire or wireless. The imaging device 1 is disposed in front of a driver, such as a steering wheel and a dashboard in the vehicle, and is adjusted in a state capable of imaging so that the a lateral or vertical face of the driver is positioned in a horizontal direction and a vertical direction of the image, when the driver sits straight on a driving seat, with the face of the driver set as the imaging object.

The imaging device 1 is provided with an MPU (Micro Processing Unit) 11 for controlling the whole device; a ROM (Read Only Memory) 12 for recording various computer programs and data executed based on the control of the MPU 11; a RAM (Random Access Memory) 13 for recording various data temporarily generated during executing the computer program recorded in the ROM 12; an imaging unit 14 constituted by using imaging elements such as a CCD (Charge Coupled Device); an A/D converter 15 for converting analogue image data obtained by imaging by the imaging unit 14 into digital data; a frame memory 16 for temporarily recording the image data converted into the digital data by the A/D converter 15; and a communication interface 17 used for the communication with the image processing device 2.

In the imaging device 1, imaging processing is performed successively or intermittently by the imaging unit 14, and based on the imaging processing, 30 sheets of image data (image frames) are generated per one second, for example, and the image data thus generated is outputted to the A/D converter 15. In the A/D converter 15, each pixel constituting the image is converted into digital image data expressed by gradation such as 256 gradations (1 Byte), which is then recorded in the frame memory 16. The image data recorded in the frame memory 16 is outputted to the image processing device 2 from the communication interface 17 at a predetermined timing. Each pixel forming the image is two-dimensionally arranged. The image data includes data showing a position of each pixel expressed by a plane orthogonal coordinates system, so-called an x-y coordinates system, and showing the luminance of each pixel expressed by a gradation value. Note that instead of showing the coordinates by the x-y coordinates system for each pixel, the coordinates may be shown for each pixel by an order of an arrangement in the data. Then, the horizontal direction of the image corresponds to the x-axial direction of the image data, and the vertical direction of the image corresponds to the y-axial direction of the image data.

The image processing device 2 is provided with a CPU (Central Processing Unit) 21 for controlling the whole device; an auxiliary recording unit 22 such as a CD-ROM drive for reading information from a recording medium 4 such as a CD-ROM in which each information such as a computer program 3 of the present invention and data are recorded; a hard disk (referred to as HD hereunder) 23 for recording each information read by the auxiliary recording unit 22; a RAM 24 for recording various data temporarily generated at the time of executing the computer program 3 recorded in the HD 23; a frame memory 25 constituted by a nonvolatile memory; and a communication interface 26 used for the communication with the imaging device 1. Then, each information such as the computer program 3 of the present invention and the data are read from the HD 23 and then stored in the RAM 24. Then, by executing various procedures included in the computer program 3 by the CPU 21, the on-vehicle computer is operated as the image processing device 2 of the present invention. The data recorded in the HD 23 includes the data on executing the computer program 3, for example, various data such as numerical values, each constant number, and parameters for setting a detection area as will be described later. In addition, the information such as a detected result is recorded in the HD 23.

The image processing device 2 receives the image data outputted from the imaging device 1 by the communication interface 26, records the received image data in the frame memory 25, reads the image data recorded in the frame memory 25, and performs various image processing. The various image processing applied to the received image data is the various processing regarding the detection of the detecting object such as detecting an outline of the face and specifying positions of eyes and nose of the driver, being the detecting object (imaging object during imaging) from the image data. Eye position detection processing can be given as an example of a specific processing, wherein the positions of the eyes are detected by pattern matching. In addition, an outline width detection processing can be given as an example of other processing, wherein the luminance arranged in the vertical direction of the image is accumulated, and by comparing the accumulated value and a predetermined threshold value, the area in the horizontal direction of the outline of the face constituted by the pixels with higher luminance than the background is detected. Further, an outline width detection processing can be given as another example, wherein the change of the accumulated value in the horizontal direction is differentiated, specifying the position where the change is large, and a boundary between the background and the outline of the face where the luminance is largely changed is detected. Contents of detailed processing are described, for example, in the documents such as Japanese Patent Application Laid Open No. 2000-163564, Japanese Patent Application Laid Open No. 2004-234494, and Japanese Patent Application Laid Open No. 2004-234367, filed by an applicant of the present invention. Note that the aforementioned image processing is not necessarily limited to the processing described in Japanese Patent Application Laid Open No. 2000-163564, Japanese Patent Application Laid Open No. 2004-234494, and Japanese Patent Application Laid Open No. 2004-234367, and can be suitably selected in accordance with conditions such as its purpose of use, hardware configuration, and cooperation with other application program.

Figure 2:
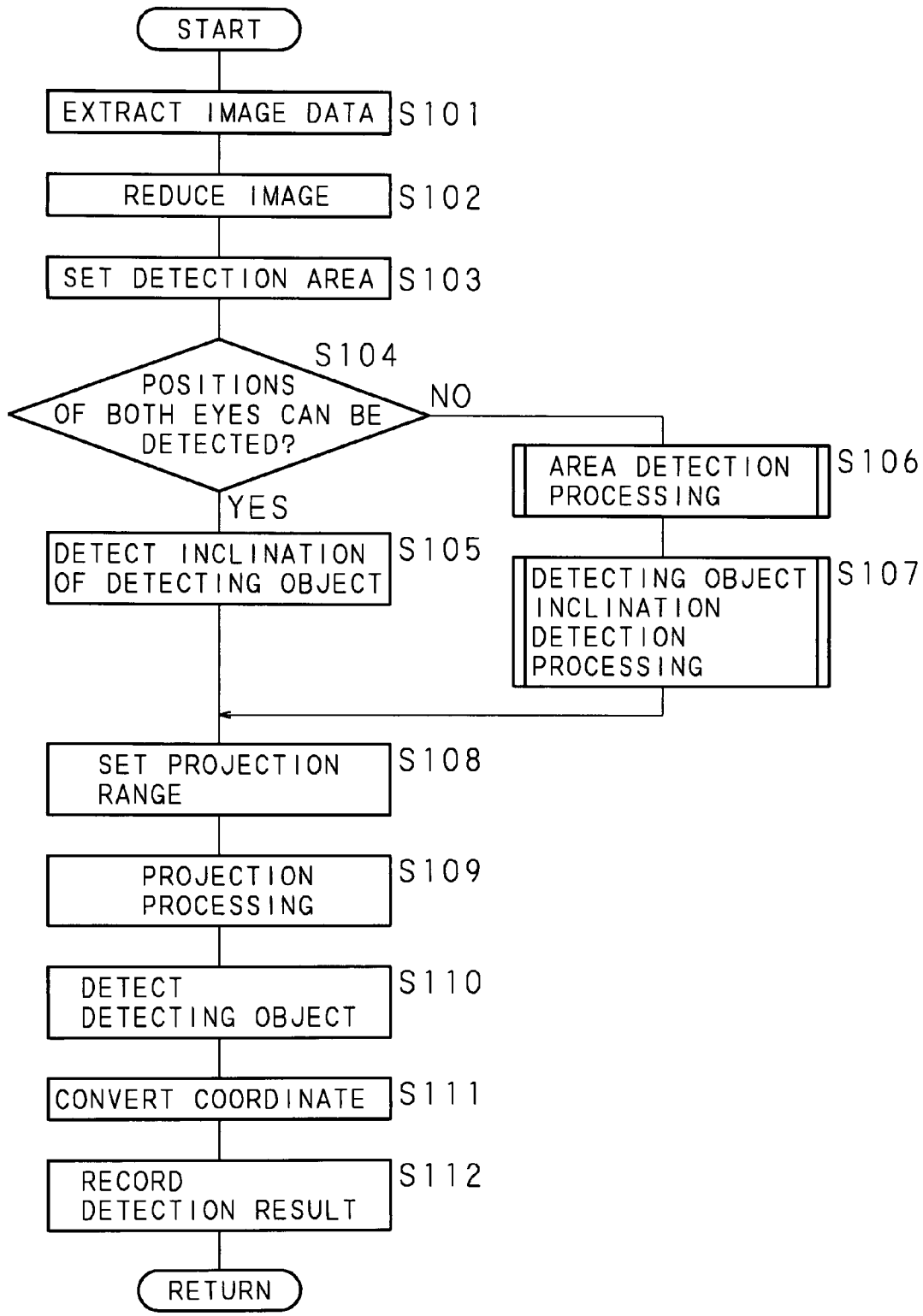
FIG. 2 is a flowchart showing a main processing of an image processing device used in the image processing system according to the embodiment 1 of the present invention.

Next, the processing of various devices used in the image processing system according to an embodiment 1 of the present invention will be explained. FIG. 2 is a flowchart showing a main processing of the image processing device 2 used in the image processing system according to the embodiment 1 of the present invention. By the control of the CPU21 that executes the computer program 3 recorded in the RAM 24, the image processing device 2 extracts, from the frame memory 25, the image data obtained by imaging by the imaging device 1 and received through the communication interface 26 (S101), reduces the image shown by the extracted image data, for example, by a ratio of 1/8 in the vertical direction and 1/8 in the horizontal direction (S102), and sets the detection area in the image shown by the reduced image data (S103). The detection area set in step S103 is a rectangular area set in the image so as to detect the detecting object, and whose one side having high possibility of detecting the detecting object is parallel to the horizontal direction of the image, and a load of detection processing can be reduced by not detecting the detecting object from an overall image, but by narrowing down the range.

By the control of the CPU 21, the image processing device 2 judges whether or not the positions of both eyes in the face of the driver, being the detecting object, can be detected (S104). In step S104, by executing the methods described in the documents showing the processing of the aforementioned eye position detection processing, etc., such as Japanese Patent Application Laid Open No. 2000-163564, Japanese Patent Application Laid Open No. 2004-234494, and Japanese Patent Application Laid Open No. 2004-234367, whether or not detecting the positions of both eyes is judged.

In step S104, when it is judged that the positions of both eyes are detected (S104:YES), the image processing device 2 detects the inclination of the detecting object in the image defined from the detected both eyes (S105). When the driver sits straight on a driving seat, straight lines connecting two points, being both eyes of the driver, are horizontal, and when the straight line connecting the two points are inclined from a horizontal state, on the assumption that the driver is inclined, the inclination of the straight line connecting both eyes with respect to the horizontal direction (x-axis) of the image is detected as the inclination of the detecting object.

In step S104, when it is judged that the positions of both eyes are not detected (S104:NO), by the control of the CPU 21, the image processing device 2 performs an area detection processing for detecting an elliptical area suitable to the face of the driver, being the detecting object, (S106), and performs detecting object inclination detection processing for detecting the inclination in the image of the detecting object in the detected area (S107). Details of the area detection processing of step S106 and the detecting object inclination detection processing of step S107 will be described later.

After the inclination of the detecting object in the image is detected in step S105 or step S107, by the control of the CPU 21, the image processing device 2 sets a rectangular projection range including the detecting object so as to detect the detecting object in accordance with the inclination (S108), and applies projection processing to the image in the projection range, wherein the luminance is accumulated in a projection direction at right angles to the inclination (S109). The projection processing of step 109 is the processing of accumulating the luminance in a direction according to the inclination of the detecting object.

By the control of the CPU 21, the image processing device 2 detects the detecting object based on the result of the projection processing (S110), converts the detected detecting object into the coordinates before the projection processing (S111), and records the information such as position and width, and inclination regarding the detecting object, as a detection result in the HD 23 and/or RAM 24 (S112). The detection of the detecting object in step S110 is the detection of the position and width of the outline of the face and the positions of eyes and nose of the driver, being the detecting object.

Then, in step S112, based on the detection result recorded in the HD23 and/or RAM24, the image processing device 2 further performs each image processing such as detection, and performs driving support processing based on the result.

Figure 3:
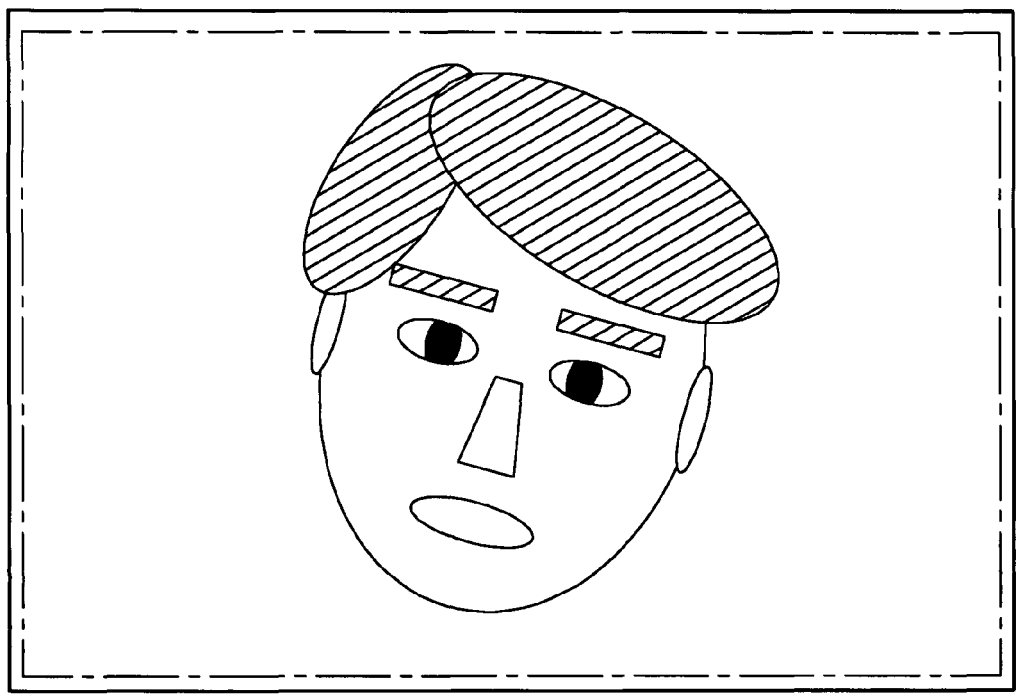
FIG. 3 is an explanatory view conceptually showing an example of set of a detection area of the image processing system according to the embodiment 1 of the present invention.

The processing explained by using the flowchart of FIG. 2 will be further specifically explained. FIG. 3 is an explanatory view conceptually showing an example of setting the detection area of the image processing system according to the embodiment 1 of the present invention. In FIG. 3, an outside frame shown by solid line is the whole image reduced in step S102, and the image of the face of the driver, being the detecting object, is included therein. An inside frame shown by one dot chain line is the detection area set in step S103.

Figure 4A:
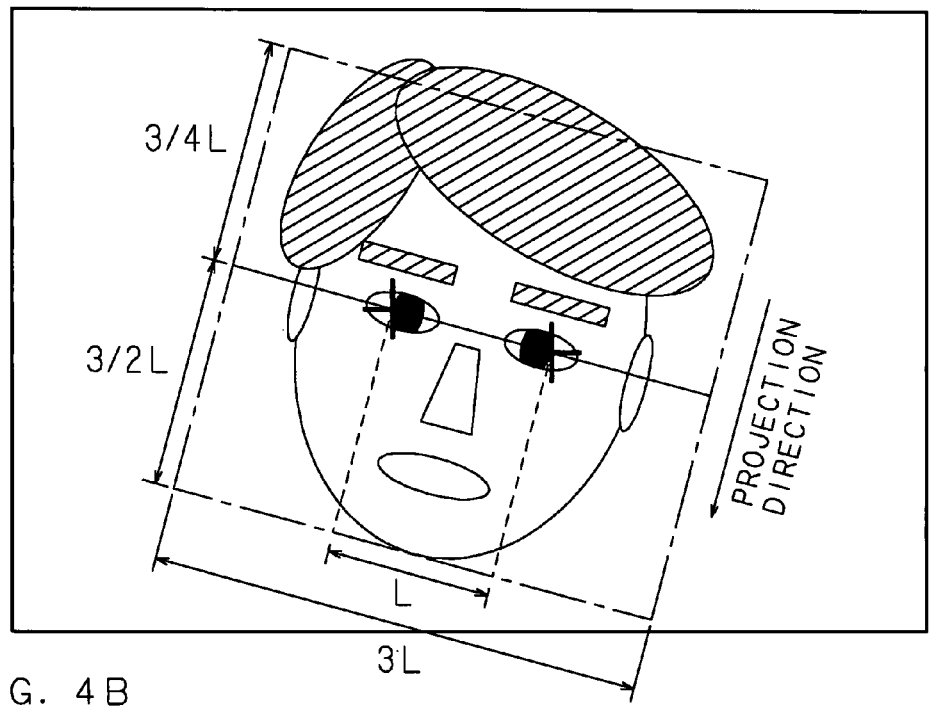
FIGS. 4A and 4B are explanatory views conceptually showing the example of detection of a detecting object after detection of an inclination of the detecting object and the detection of the detecting object after projection processing in the image processing system according to the embodiment 1 of the present invention.
Figure 4B:
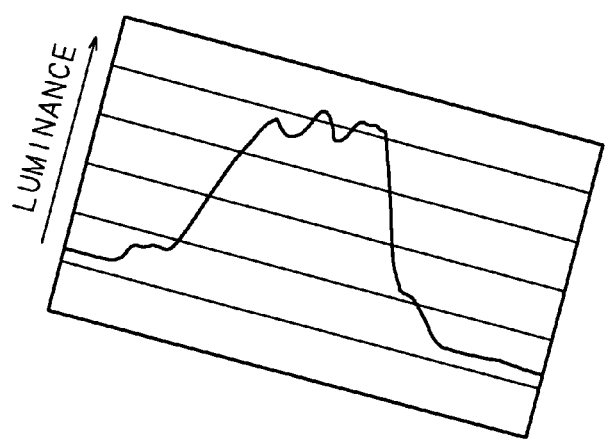

FIG. 4A and FIG. 4B are explanatory views conceptually showing the example of detection of the inclination of the detecting object of the image processing system and the detection of the detecting object after projection processing, in the image processing system according to the embodiment 1 of the present invention. FIG. 4A conceptually shows a state of detecting the positions of both eyes and detecting the inclination of the detecting object, from the image shown in FIG. 3. In FIG. 4A, two points shown by cross-shape show the positions of both eyes detected from the image of the face of the driver, being the detecting object. The detection of the inclination of the detecting object shown in step S105 is performed based on the inclination of a segment connecting two points detected as shown in FIG. 4A. A rectangle shown by one dot chain line in FIG. 4A shows the projection range set in step S108. The width of the set projection range is determined in a line segment with a length of 3 L parallel to a direction of connecting both eyes, with a center point of the both eyes as a center, when a distance between both eyes detected in the detecting object is defined as L. In addition, height of the projection range to be set is a distance from the position of 3/4 L in a direction perpendicular to the line segment connecting both eyes on the upper side (in a direction of a head of the driver) from the center point of the detected both eyes, to the position of 3/2 L in a direction perpendicular to the line segment connecting both eyes on the lower side (in a direction of a jaw of the driver). Note that the projection direction for accumulating the luminance of the pixels is a direction perpendicular to the direction connecting both eyes as shown by arrows in FIG. 4A.

FIG. 4B shows the processing of detecting the detecting object based on the result of the projection processing in step S110. FIG. 4B shows a distribution in a width direction of the detecting object of the luminance of the pixels in the projection range. As shown in FIG. 4B, the luminance is high at the position corresponding to the vicinity of the center of the face of the driver, namely, at the position corresponding to the nose, and the luminance becomes lower toward the outside. Thus, the distribution of the luminance of being higher toward the vicinity of the imaging device 1 is noticeable by disposing an illuminating device such as an LED (Light Emitting Diode) in the vicinity of the imaging device 1.

Figure 5:
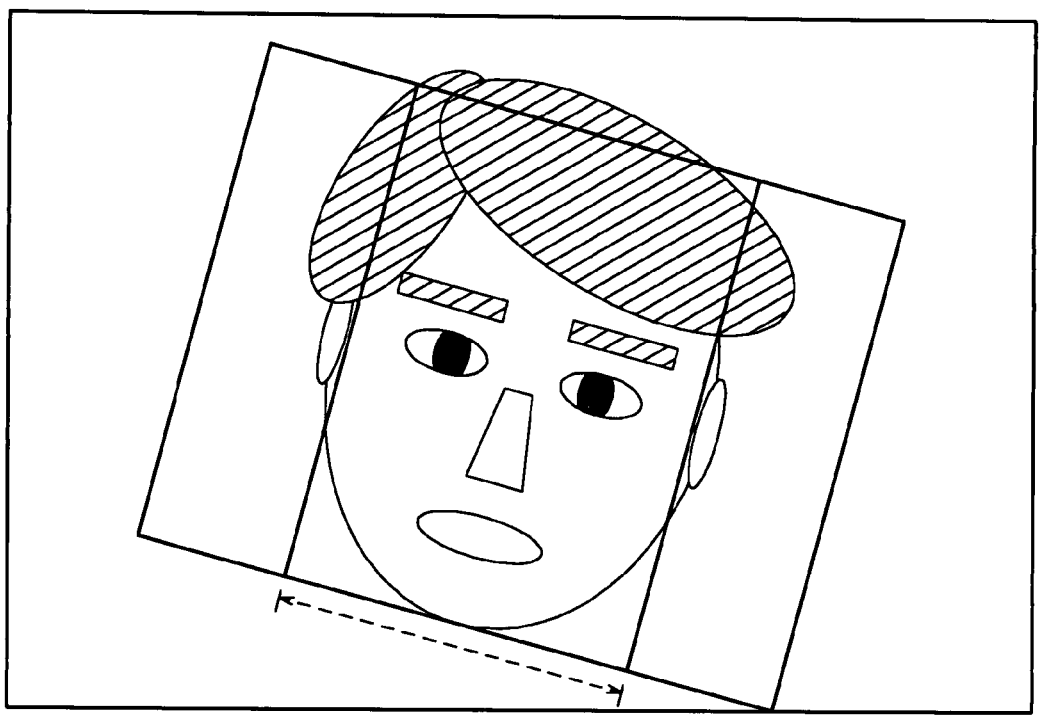
FIG. 5 is an explanatory view conceptually showing the example of the detection of the detecting object of the image processing system according to the embodiment 1 of the present invention.

FIG. 5 is an explanatory view conceptually showing an example of detecting the detecting object of the image processing system according to the embodiment 1 of the present invention. FIG. 5 shows a state of detecting the width of an inclined detecting object based on the distribution of the accumulated values of the luminance shown in FIG. 4B, and the range shown by broken double-pointed arrow shows the detected width. Various detection processing based on the distribution of the luminance shown in FIG. 4B is performed by executing the processing described in the documents such as Japanese Patent Application Laid Open No. 2000-163564, Japanese Patent Application Laid Open No. 2004-234494, and Japanese Patent Application Laid Open No. 2000-234367. Note that the information showing the detected result such as the width of the detecting object is recorded in the HD23 and/or RAM24.

Figure 6:
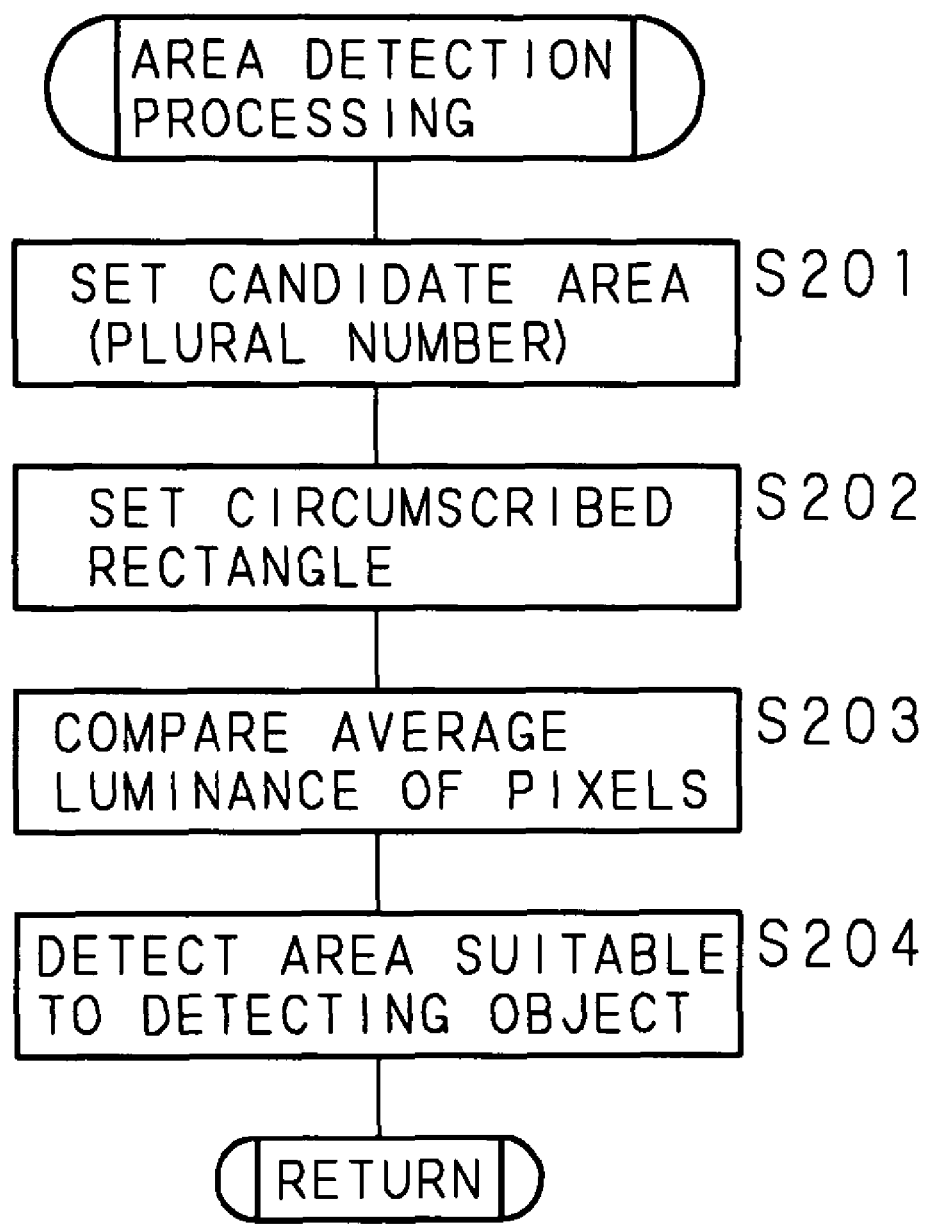
FIG. 6 is a flowchart showing an area detection processing of the image processing device used in the image processing system according to the embodiment 1 of the present invention.

FIG. 6 is a flowchart showing the area detection processing of the image processing device 2 used in the image processing system according to the embodiment 1 of the present invention. The area detection processing corresponds to step S106 in the main processing explained by using FIG. 2. By the control of the CPU 21 that executes the computer program 3 recorded in the RAM 24, the image processing device 2 sets the elliptical candidate area which becomes the candidates of the area of the detecting object in the image and whose short axial direction and long axial direction are parallel to the horizontal direction (x-axial direction) and the vertical direction (y-axial direction), respectively (S201); sets a rectangle which circumscribes the set candidate area as a circumscribed rectangle and whose short side direction and long side direction are parallel to the short axial direction and the long axial direction, respectively (S202); and compares the average luminance of the pixels in the set candidate area with the average luminance of the pixels outside the candidate area (S203). By the control of the CPU 21, the image processing device 2 repeats the processing of steps S201 to S203 for a plurality of times, namely sets a plurality of candidate areas, and by the result obtained by comparing the average luminance of the pixels inside the set candidate areas with the average luminance outside the candidate areas, the candidate area judged to have a largest difference of the average luminance of the pixels is detected as the area suitable to the detecting object (S204).

The processing explained by using the flowchart of FIG. 6 will be further specifically explained. FIG. 7 is an explanatory view conceptually showing the example of the candidate areas and the circumscribed rectangle set in the image processing system according to the embodiment 1 of the present invention. In FIG. 7, ellipses shown by solid line are the candidate areas set in step S201, and the ellipses set as the candidate areas are set by using parameters including center coordinates (x, y), a short radius (cx) parallel to the horizontal direction (x-axial direction) of the image and a long radius (cy) parallel to the vertical direction (y-axial direction). Note that for convenience of explanation, the radius parallel to the x-axial direction is defined as the short radius, and the radius parallel to the y-axial direction is defined as the long radius. However, the radius parallel to the x-axial direction may be longer than the radius parallel to the y-axial direction, or may be the same length. In FIG. 7, the rectangle that circumscribes the ellipse, being the candidate area, is a circumscribed rectangle set in step S202.

In addition, the comparison of the average luminance in step S203 is performed by calculating an ellipsoidal score defined by a following expression 1, which is the difference between the average luminance of the pixels included in the area inside the candidate areas shown by oblique line from the upper right to the lower left of FIG. 7 and the average luminance of the pixels included in the area outside the candidate areas shown by the oblique line from the upper left to the lower right of FIG. 7.

$$S(x, y, cx, cy) = F(E(x, y, cx, cy)) - F(N(x, y, cx, cy)) \quad \text{expression 1}$$

wherein x: x coordinates of the elliptical center
y: y coordinates of the elliptical center
cx: short radius parallel to the x-axial direction
cy: long radius parallel to the y-axial direction
S (x, y, cx, cy) : ellipsoidal score
F (P): average luminance of the pixels
E (x, y, cx, cy): area inside the candidate area
N (x, y, cx, cy): area outside the candidate area However, irrespective of the inside and outside the candidate areas, the pixel showing abnormally high luminance is also included. Therefore, the pixel showing an abnormality value needs to be previously removed, when an accurate average luminance of the pixels is calculated. Then, an upper limit value of the luminance of the pixel is previously set, and the pixel with the luminance higher than the upper limit value is regarded as showing the abnormality value, and the pixel with the luminance lower than the upper limit value is defined as an effective pixel, and the average value of the luminance of the pixels is calculated only for the effective pixels, by using a following expression 2.

$$F(P) = \Sigma A(P)/C(P) \quad \text{expression 2}$$

wherein P: effective pixel
A(P): luminance value of the pixel P
C(P): the number of the pixel P The larger the value of the ellipsoidal score defined by the expression 1 is, the larger the difference between the average luminance of the pixels inside the candidate areas and the average luminance of the pixels outside the candidate areas becomes. Namely, the image shown in the area inside the candidate area is different from the image outside the candidate area, and therefore the candidate area can be regarded as being suitable to the detecting object. Note that the parameters such as center (x, y), short radius (cx) and long radius (cy) for setting the candidate areas are set from inside the range based on the previous detection result recorded in the HD 23 and/or RAM 24, for the purpose of preventing error detection, reducing a processing load, and improving a processing speed, and specifically set in the range shown by a following expression 3.

$$S(X'-m1, y'-n1, cx'-2, cy'-n2) \text{ to } S(x'+m1, y'+n1, cx'+m2, cy'+n2) \quad \text{expression 3}$$

wherein x': x coordinates of the previous elliptical center
y': y coordinates of the previous elliptical center
cx': short radius parallel to the previous x-axis
cy': long radius parallel to the previous y-axis
m1: range of the x coordinates of the center
n1: range of the y coordinates of the center
m2: range of the short radius
n2: range of the long radius The candidate area with largest ellipsoidal score shown by the expression 1 is detected in the range shown by the expression 3. However, coordinates (x, y) of the elliptical center with largest ellipsoidal score are firstly obtained in the range shown by a following expression 4.

$$S(x'-m1, y'-n1, cx', cy') \text{ to } S(x'+m1, y'+n1, cx', cy') \quad \text{expression 4}$$

By using the coordinates (x, y) of the elliptical center obtained in the range of expression 4, the short radius (cx) and the long radius (cy), whereby the largest ellipsoidal score is obtained, are determined in the range shown by a following expression 5.

$$S(x, y, cx'-m2, cy'-n2) \text{ to } S(x, y, cx'+m2, cy'+n2) \quad \text{expression 5}$$

In step S204, the elliptical candidate area shown by the coordinates (x, y) of the elliptical center obtained in the range of the expression 4 and shown by the short radius (cx) and the long radius (cy) obtained in the range of the expression 5 is detected as the area suitable to the detecting object.

Figure 8:
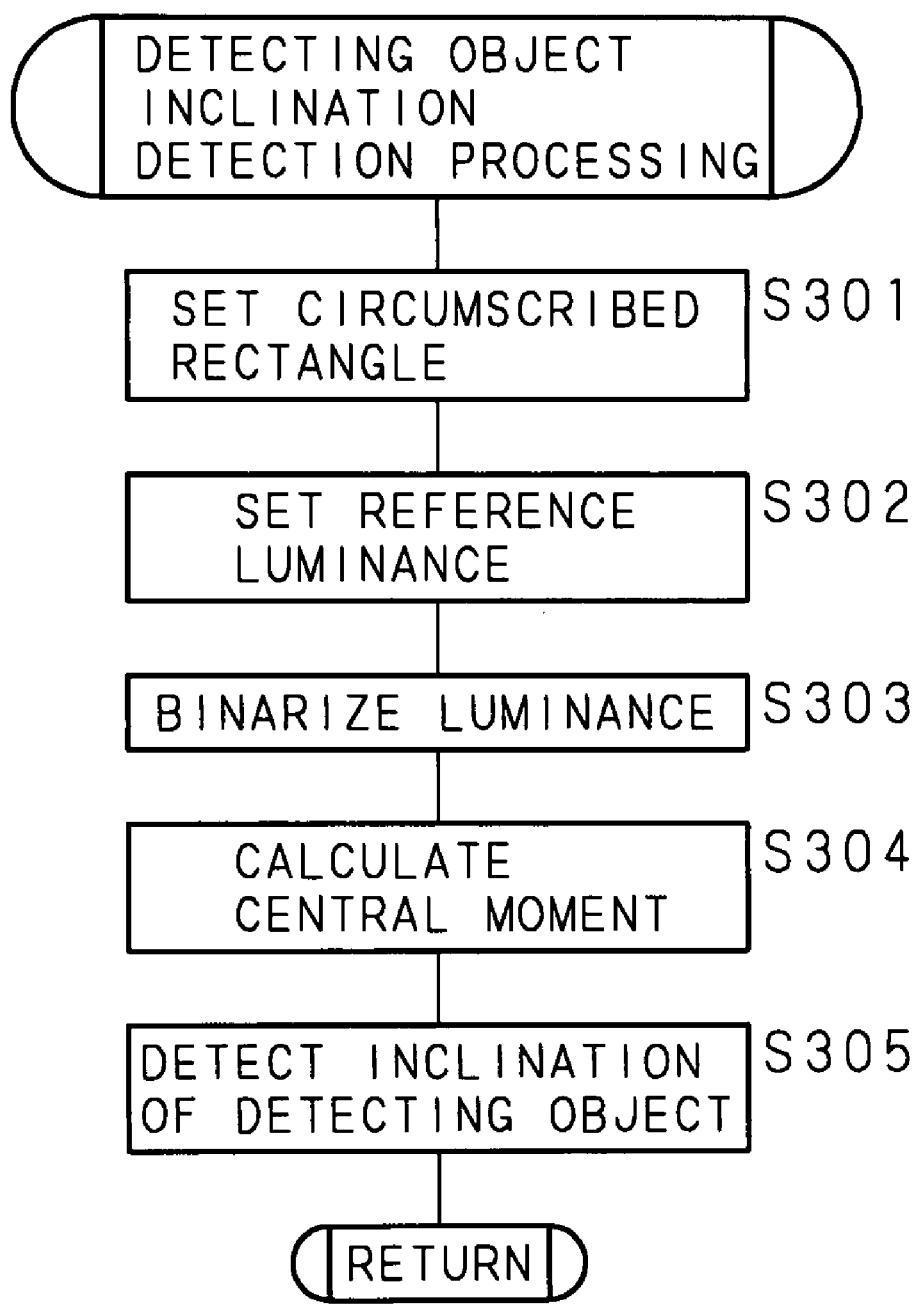
FIG. 8 is a flowchart showing a detection processing of an inclination of the detecting object of the image processing device used in the image processing system according to the embodiment 1 of the present invention.

FIG. 8 is a flowchart showing a detecting object inclination detection processing of the image processing device 2 used in the image processing system according to the embodiment 1 of the present invention. The detecting object inclination detection processing corresponds to step S107 in the main processing explained by using FIG. 2. By the control of the CPU 21 for executing the computer program 3 recorded in the RAM 24, the image processing device 2 sets a rectangle as a circumscribed rectangle, which circumscribes the area suitable to the elliptical detecting object detected by the area detection processing shown by using the flowchart of FIG. 6, so that the short side direction and the long side direction are parallel to the short axial direction and the long axial direction, respectively (S301). By the control of the CPU 21, the image processing device 2 sets a central value of the luminance obtained from the distribution, for example, as a reference luminance within a circumscribed rectangle (S302) based on the distribution of the luminance of pixels included in the set circumscribed rectangle, and based on the set reference luminance, the luminance of the circumscribed rectangle is binarized (S303). Then, by the control of the CPU 21, the image processing device 2 calculates the central moment around a reference point, with the center of the ellipse as a center, based on the distribution of pixels with higher luminance than the reference luminance in the circumscribed rectangle (S304), and detects the inclination of the detecting object in the image (S305), based on the calculated central moment.

The processing explained by using the flowchart of FIG. 8 will be further specifically explained. The pixel of the area corresponding to the face of the driver has higher luminance than the luminance of pixel of the area corresponding to the background. Therefore, by the binarization shown in step S303, when the value of pixel with luminance higher than the reference luminance is defined as "1", and the value of pixel with the luminance of under the reference luminance is defined as "0", the area of the detecting object corresponding to the face of the driver can be extracted as the pixel of value "1". Then, when the extracted area is shown as f(x, y) by using the coordinates of the pixel, and the coordinates of the reference point, being the center of the ellipse is shown as $(x_o, y_o)$, the central moment shown in step S304 can be calculated by a following expression 6.

$$Mpq = \sum_x \sum_y (x - x_o)^p \cdot (y - y_o)^q \cdot f(x, y) \qquad \text{expression 6}$$

wherein Mpq: central moment
 f(x, y): the area of the detecting object shown by the coordinates (x, y)
 $(x_o, y_o)$: coordinates of the reference point
 p, q: an integer not less than 0 satisfying p+q=2

Then, the detecting object, namely, the face of the driver has an appearance of an elliptical shape, and when the vertical direction of the face corresponds to the long axial direction of the ellipse, the inclination of the detecting object in step S305, namely, the inclination θ of the short axis of the detecting object with respect to the x-axis can be calculated by a following expression 7.

$$\theta = (\tfrac{1}{2})\tan^{-1}\{2M11/(M20-M02)\} \qquad \text{expression 7}$$

wherein θ: the inclination of the detecting object

Figure 9:
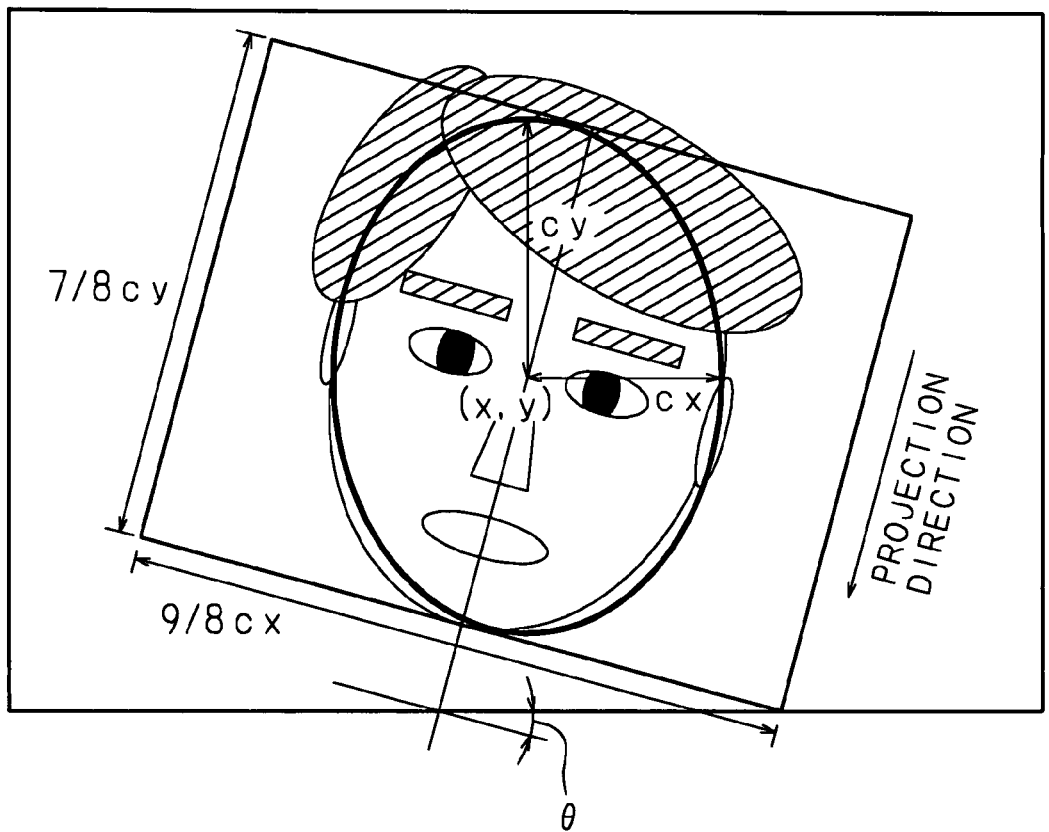
FIG. 9 is an explanatory view showing the example of a projection range of the image processing system according to the embodiment 1 of the present invention.

Note that as the detecting object inclination detection processing, when the inclination of the detecting object is detected by using the central moment, the projection range of the rectangle set in step S108 of the main processing shown by using FIG. 2 is set based on the elliptical-shaped area suitable to the detecting object and the central moment. FIG. 9 is an explanatory view showing the example of the projection range of the image processing system according to the embodiment 1 of the present invention. In FIG. 9, the ellipse shown by solid line shows the detected area as the area suitable to the detecting object in step S204. In addition, the inclination of the line segment passing through the center of the detecting object, being the face of the driver, shows an inclination 0 of the short axis of the detecting object with respect to the calculated x-axis. Also, the projection direction is shown by an arrow parallel to the line segment showing the inclination. When the coordinates of the center of the ellipse detected as the area suitable to the detecting object is shown as (x, y), the short radius parallel to the x-axial direction of the same is shown as cx, and the long radius parallel to the y-axial direction of the same is shown as cy, the width of the set projection range, namely, the range in the x-axial direction after conversion of the coordinates system is the range, with the coordinates (x, y) set as the center and the length in a direction orthogonal to the line segment showing the inclination set at 9/8 cx. In addition, the height of the set projection range, namely, the range in the y-axial direction after conversion of the coordinates system is the range, with the coordinates (x, y) set as the center and a length in a direction parallel to the line segment showing the inclination set at 7/8 cy.

Simply examples are given in the embodiment 1, such as the shape of the candidate area, a setting procedure, the processing of the detection of the detecting object from the candidate areas, and detection of the inclination, and each condition required for this processing, and the present invention can be suitably set in accordance with a system configuration and a purpose of use.

Embodiment 2

Figure 10:
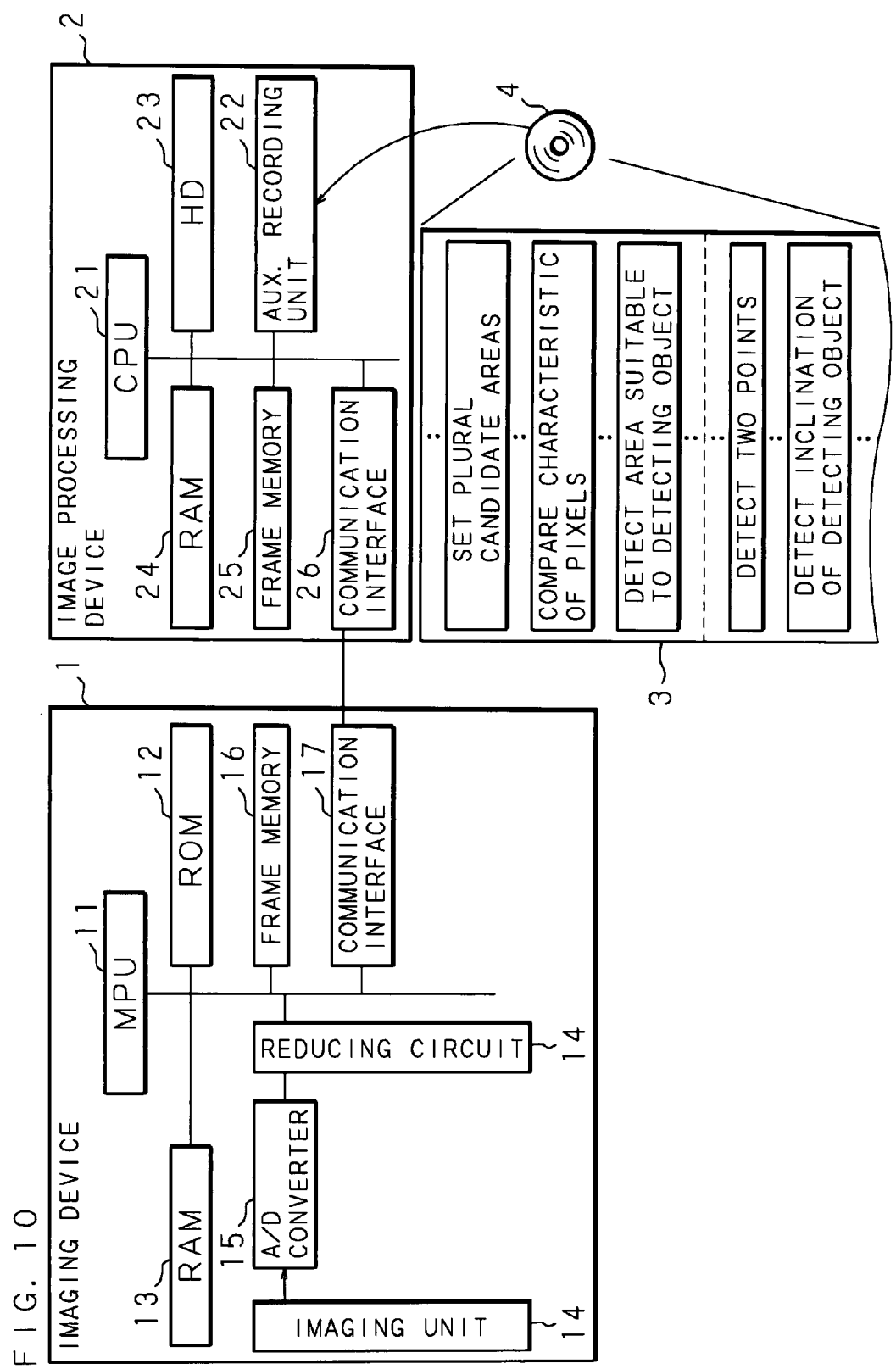
FIG. 10 is a block diagram showing a configuration example of the image processing system according to an embodiment 2 of the present invention.

An embodiment 2 has a configuration that the processing of reducing the image is performed by the imaging device 1 according to the embodiment 1. FIG. 10 is a block diagram showing a configuration example of the image processing system according to the embodiment 2 of the present invention. In FIG. 10, reference numeral 1 denotes the imaging device, and the imaging device 1 is provided with the MPU 11, the ROM 12, the RAM 13, the imaging unit 14, the A/D converter 15, the frame memory 16, the communication interface 17, and a reducing circuit 18 for performing reducing processing of the image.

Then, in the imaging device 1, the imaging processing is performed by the imaging unit 14, and the image converted into the digital image data by the A/D converter 15 is reduced by the reducing circuit 18, and is recorded in the frame memory 16. Then, the image data of the reduced image recorded in the frame memory 16 is outputted to the image processing device 2 from the communication interface 17 at a predetermined timing.

The image processing device 2 is provided with the CPU 21; the auxiliary recording unit 22 for reading the information from the recording medium 4 in which each information such as computer program 3 of the present invention and data is recorded; and the HD 23, the RAM 24, the frame memory 25, and the communication interface 26.

In the image processing system according to the embodiment 2 of the present invention, the processing corresponding to the reducing processing of step 102 of the embodiment 1 is performed by the reducing circuit 18 of the imaging device 1, and the image data showing the image that has undergone the reducing processing is outputted to the image processing device 2. The processing in the image processing device 2 is the same as the processing of the embodiment 1, and therefore the embodiment 1 is referenced and an explanation is omitted. However, needless to say, the reducing processing in step S102 of the embodiment 1 is already performed by the imaging device 1, and is not executed.

According to the embodiment 2, the reducing processing is performed by the imaging device 1. However, a part or an entire part of the processing of the embodiment 1 is performed by the imaging device 1, and therefore the present invention can be developed to an infinite number of modes.

Embodiments 1 and 2 show the mode of defining the driver of the vehicle as the detecting object. However, the present invention is not limited thereto and various persons, and living matters other than the persons or non-living matters may be defined as the detecting object.

In addition, according to the embodiments 1 and 2, the detecting object is detected from the image generated by imaging by the imaging device using the on-vehicle camera. However, the present invention is not limited thereto, and can be applied to various image processing in which the generated image is recorded in the HD by various devices and by various methods and a specific detecting object is detected from the recorded image.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. An image processing method using an image processing device which detects a specific detecting object from an image including a plurality of two-dimensionally arranged pixels, comprising:
    setting a plurality of candidate elliptical areas, each defined by using a center and lengths in both a first direction and a second direction orthogonal to each other, that become areas of a detecting object in the image;
    comparing luminance of the pixels inside the candidate areas with the luminance of the pixels outside the candidate areas, for each of the set candidate areas;
    detecting an area suitable to the detecting object out of a plurality of the set candidate areas on the basis of the comparison result;
    setting, as a circumscribed rectangle, a rectangle that circumscribes the area suitable to the detecting object and has one side parallel to the first direction;
    setting a reference luminance based on distribution of luminance of pixels which are included in the circumscribed rectangle;
    calculating a central moment around a center of the distribution of the pixels with higher luminance than the reference luminance in the circumscribed rectangle; and
    detecting an inclination of the detecting object in the first direction in the image.

2. The image processing method as set forth in claim 1, wherein said comparing is performed by comparing average luminance of the pixels inside the candidate areas with average luminance of the pixels outside the candidate areas as the luminance of the pixels.

3. The image processing method as set forth in claim 2, wherein said detecting is performed by detecting a candidate area, whose difference of luminance is determined to be the maximum, as an area of the detecting object.

4. The image processing method as set forth in claim 1, further comprising:
    detecting two specific points included in the detecting object; and
    detecting an inclination of the detecting object in the image defined by the detected two points.

5. The image processing method as set forth in claim 4, characterized in that
    an imaging device is connected to the image processing device;
    the detecting object is a face of a person imaged by the imaging device; and
    the step of detecting is performed by detecting both eyes of the person, as two specific points.

6. The image processing method as set forth in claim 5, characterized by further comprising the step of generating an image for detection of the detecting object by reducing an original image.

7. An image processing system including an imaging device which generates an image and an image processing device which detects a specific detecting object from the image including a plurality of two-dimensionally arranged pixels, characterized in that the image processing device comprises:
    a setting part which sets a plurality of candidate elliptical areas, each defined by using a center and lengths in both a first direction and a second direction orthogonal to each other, that become areas of a detecting object in the image;
    a comparing part which compares luminance of the pixels inside the candidate areas with the luminance of the pixels outside the candidate areas, for each of the set candidate areas;
    a detecting part which detects an area suitable to the detecting object out of a plurality of the set candidate areas on the basis of the comparison result;
    a part which sets as a circumscribed rectangle a rectangle that circumscribes an area suitable to the detecting object detected by the detecting part and has one side parallel to the first direction;
    a part which sets a reference luminance based on distribution of luminance of pixels which are included in the circumscribed rectangle;
    a part which calculates a central moment around a center of the distribution of the pixels with higher luminance than the reference luminance in the circumscribed rectangle; and
    a part which detects an inclination of the detecting object in the first direction in the image.

8. The image processing system as set forth in claim 7, wherein said comparing part compares average luminance of the pixels inside the candidate areas with average luminance of the pixels outside the candidate areas as the luminance of the pixels.

9. The image processing system as set forth in claim 8, wherein said detecting part detects a candidate area, whose difference of luminance is determined to be the maximum, as an area of the detecting object.

10. The image processing system as set forth in claim 9,
    wherein the detecting object has a reference point and a reference direction, and
    wherein the image processing device further comprises:
        a part which calculates a central moment around the reference point, based on distribution of luminance of the pixels according to the detecting object detected by the detecting part; and
        a part which detects an inclination of the detecting object in the reference direction in the image, based on the calculated central moment.

11. The image processing system as set forth in claim 7 further comprising:
    a detecting part which detects two specific points included in the detecting object; and a part which detects an inclination of the detecting object in the image, said inclination being defined on the basis of the detected two points.

12. The image processing system as set forth in claim 11, characterized in that the detecting object is a face of a person imaged by the imaging device, and the detecting part detects both eyes of the person as two specific points.

13. The image processing system as set forth in claim 12, characterized by further including a part which generates an image for detection of the detecting object by reducing an original image.

14. An image processing device which detects a specific detecting object from an image including a plurality of two-dimensionally arranged pixels, comprising:

a part which sets a plurality of candidate elliptical areas, each defined by using a center and lengths in both a first direction and a second direction orthogonal to each other, that become areas of the detecting object in the image;

a part which compares luminance of the pixels inside the candidate areas with the luminance of the pixels outside the candidate areas, for each of the set candidate areas;

a part which detects an area suitable to the detecting object out of a plurality of the set candidate areas, based on the comparison result;

a part which sets, as a circumscribed rectangle, a rectangle that circumscribes an area suitable to the detecting object detected by the detecting method has one side parallel to the first direction;

a part which sets a reference luminance based on distribution of luminance of pixels which are included in the circumscribed rectangle;

a part which calculates a central moment around a center of the distribution of the pixels with higher luminance than the reference luminance in the circumscribed rectangle; and a part which detects an inclination of the detecting object in the first direction in the image.

15. The image processing device as set forth in claim 14, further comprising:

a part which detects two specific points included in the detecting object; and a part which detects an inclination of the detecting object in the image, said inclination being defined on the basis of the detected two points.

16. A computer program product stored on a non-transitory computer-readable medium for controlling a computer that detects a specific detecting object from image data showing an image including a plurality of two-dimensionally arranged pixels, comprising:

setting a plurality of candidate elliptical areas, each defined by using a center and lengths in both a first direction and a second direction orthogonal to each other, that become candidates of areas of a detecting object in the image shown by the image data;

comparing luminance of the pixels inside the candidate areas with the luminance of the pixels outside the candidate areas, for each of the set candidate areas;

detecting an area suitable to the detecting object out of a plurality of the set candidate areas, based on the comparison result;

setting, as a circumscribed rectangle, a rectangle that circumscribes the area suitable to the detecting object and has one side parallel to the first direction;

setting a reference luminance based on distribution of luminance of pixels which are included in the circumscribed rectangle;

calculating a central moment around a center of the distribution of the pixels with higher luminance than the reference luminance in the circumscribed rectangle; and detecting an inclination of the detecting object in the first direction in the image.

17. The computer program product as set forth in claim 16, further comprising:

detecting two specific points included in the detecting object; and detecting an inclination of the detecting object in the image defined on the basis of the detected two points.

* * * * *

UNITED STATES PATENT AND TRADEMARK OFFICE
CERTIFICATE OF CORRECTION

| | |
|---|---|
| PATENT NO. | : 8,045,765 B2 |
| APPLICATION NO. | : 11/889999 |
| DATED | : October 25, 2011 |
| INVENTOR(S) | : Kozo Baba et al. |

Page 1 of 1

It is certified that error appears in the above-identified patent and that said Letters Patent is hereby corrected as shown below:

IN THE CLAIMS:

Column 16, Line 31, In Claim 7, delete "sets" and insert -- sets, --, therefor.

Column 16, Line 31, In Claim 7, delete "rectangle" and insert -- rectangle, --, therefor.

Column 17, Line 31, In Claim 14, delete "method" and insert -- part and --, therefor.

Signed and Sealed this
Thirty-first Day of January, 2012

David J. Kappos
*Director of the United States Patent and Trademark Office*